Jan. 20, 1925.
C. M. WALES
1,523,922
HARROW PLOW
Filed Aug. 23, 1923   2 Sheets-Sheet 2
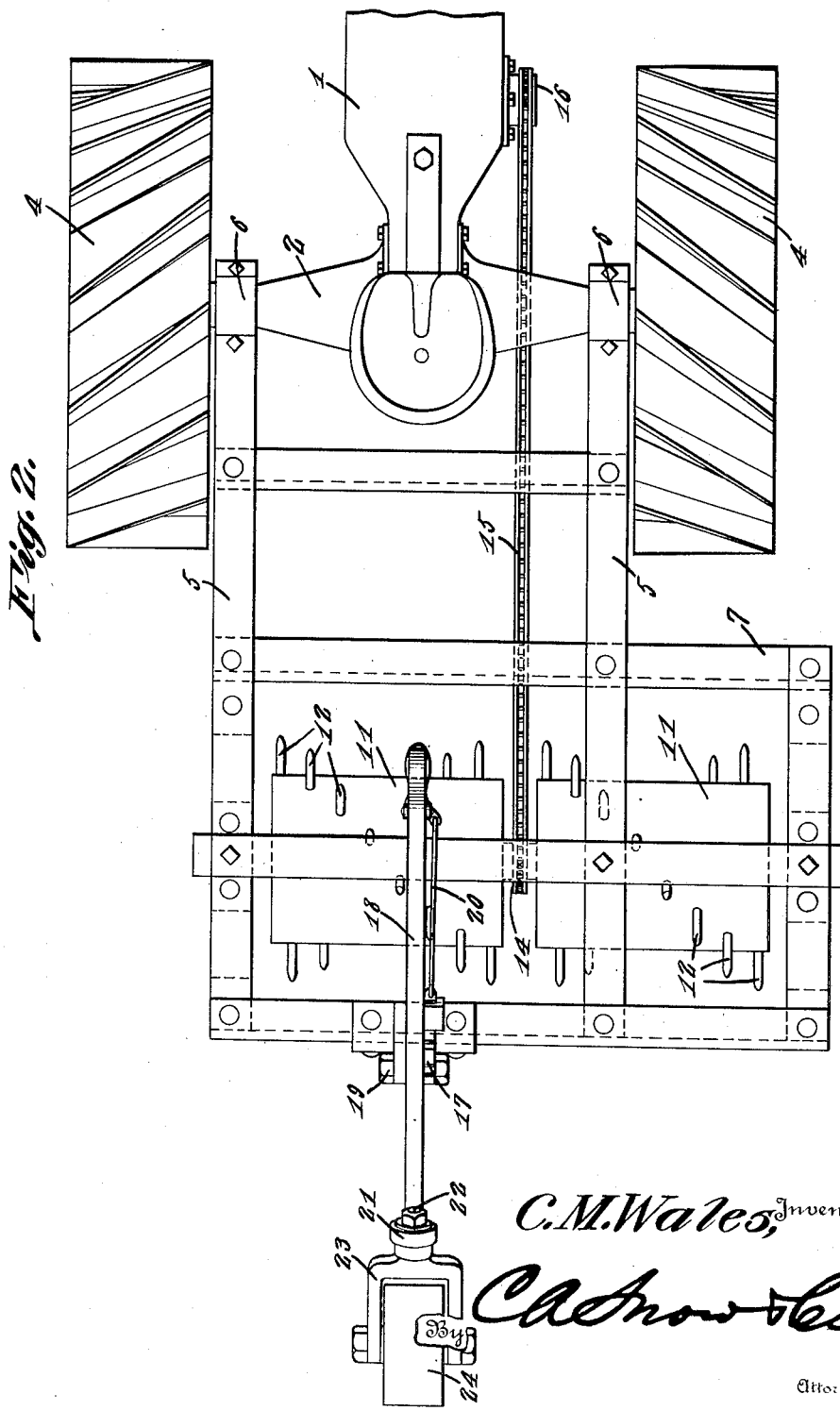

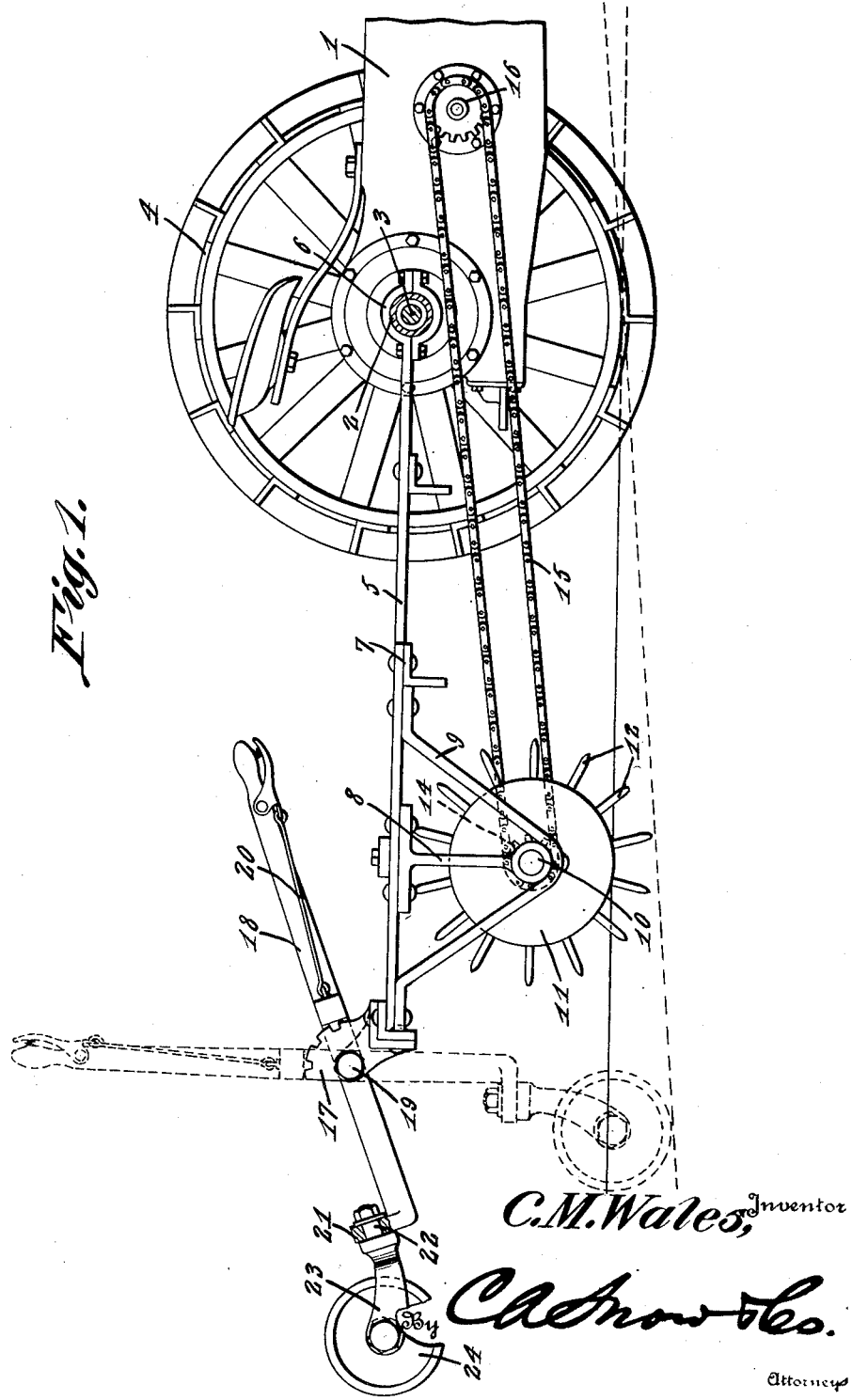

Patented Jan. 20, 1925.

1,523,922

UNITED STATES PATENT OFFICE.

CORNELIUS M. WALES, OF BOONEVILLE, MISSISSIPPI.

HARROW PLOW.

Application filed August 23, 1923. Serial No. 658,973.

*To all whom it may concern:*

Be it known that I, CORNELIUS M. WALES, a citizen of the United States, residing at Booneville, in the county of Prentiss and State of Mississippi, have invented a new and useful Harrow Plow, of which the following is a specification.

This invention aims to provide novel means whereby soil engaging elements may be rotated readily from a tractor or other machine, so as to bring about a thorough breaking up of the surface of the soil.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:

Figure 1 shows in side elevation, a device constructed in accordance with the invention, parts being broken away; and Figure 2 is a top plan.

The numeral 1 marks the frame work of a tractor, the rear axle casing being designated by the numeral 2, and the numeral 3 denoting the rear axle, the same carrying the rear ground wheels 4.

A frame 5 is provided and is connected at forward ends by bearings 6 with the axle casing 2, for vertical swinging movement, the frame 5 having a lateral extension 7 extended to the rear of one of the wheels 4.

Depending bearing brackets 8 are mounted on the body portion of the frame 5 upon the extension 7 on opposite sides of the frame and are sustained by braces 9. In the bearing brackets 8, an axle 10 is journaled for rotation. Spaced drums 11 are secured to the shaft 10 and are equipped with soil-engaging spurs 12, of any desired sort. Any suitable means may be provided for rotating the drums 11. In the present embodiment of the invention a sprocket wheel 14 is secured to the shaft 10 between the drums 11, a sprocket chain 15 engaging the wheel 14 and engaging a sprocket wheel 16 on the tractor, the sprocket wheel 16 being driven by the tractor.

The drums 11 roll in contact with the ground and are rotated at a high rate of speed by way of the sprocket wheel 16, the sprocket chain 15 and the sprocket wheel 14 or any other equivalent mechanism. The surface of the soil is broken up by the spurs 12 and is thrown rearwardly, a highly efficient and extremely simple means thus being provided for breaking up the soil rapidly, the frame 5, of course, being drawn forwardly over the ground by the tractor.

Any suitable means may be supplied for raising and lowering the rear end of the frame 5 so that the spurs 12 of the drums 11 will not engage the ground, such an operation being desirable, for instance when the implement is being transported from place to place. If preferred, a segment 17 may be mounted on the rear end of the frame 5, a lever 18 being fulcrumed intermediate its ends, as at 19, upon the segment, the lever 18 having a latch mechanism 20 adapted to engage the segment 17. The lever 18 has a rearwardly extended foot 21 wherein is journaled for rotation, the stem 22 of a fork 23 whereon a caster wheel 24 is mounted. By swinging the upper end of the lever 18 rearwardly, the caster wheel 14 may be carried downwardly far enough to lift the spurs 12 and the drums 11 entirely clear of the ground, or, if preferred, the wheel 24 merely may be brought into contact with the surface of the ground, to obviate any tendency in the frame 5 to swing laterally. The lever 18 may be held in any position to which it may have been adjusted by engaging the latch mechanism 20 with the segment 17.

What is claimed is:

The combination with a power driven vehicle, comprising a rear axle casing, a rotatable element, and ground wheels located at the ends of the casing; of a frame mounted on the casing for vertical swinging movement and substantially filling the space between the wheels, one side of the frame being straight, and the other side of the frame having a lateral extension located behind one wheel, an axle journaled in the frame, a driving connection between the axle and the rotatable element, and rotatable soil-engaging members, carried by the axle and disposed symmetrically with respect to the driving connection, one soil-engaging member being located partly in the extension and behind said wheel.

In testimony that I claim the foregoing as my own, I have hereto affixed my signature in the presence of two witnesses.

CORNELIUS M. WALES.

Witnesses:
 THO. H. ISBELL,
 JOSEPH SANDERS.